United States Patent [19]

Macdonald

[11] Patent Number: 5,049,723

[45] Date of Patent: Sep. 17, 1991

[54] SYSTEM FOR DETECTING PENETRATION OF A BLANK

[75] Inventor: John L. Macdonald, Cincinnati, Ohio

[73] Assignee: Cincinnati Incorporated, Cincinnati, Ohio

[21] Appl. No.: 496,518

[22] Filed: Mar. 20, 1990

[51] Int. Cl.⁵ .............................................. B23K 26/00
[52] U.S. Cl. .......................... 219/121.83; 219/121.67; 219/121.7; 219/121.78
[58] Field of Search .......... 219/121.7, 121.71, 121.67, 219/121.72, 121.83, 121.82, 121.78, 121.79

[56] References Cited

U.S. PATENT DOCUMENTS 3,567,899  3/1971  Iceland .......................... 219/124.34

FOREIGN PATENT DOCUMENTS 0033476  8/1984  Japan .............................. 215/121.72
0154893  8/1985  Japan .............................. 219/121.67

*Primary Examiner*—C. L. Albritton
*Attorney, Agent, or Firm*—Frost & Jacobs

[57] ABSTRACT

A system for detecting penetration through a blank by the beam of a laser cutter prior to cutting a workpiece from a blank. The laser cutting includes a frame defining an interior area bounded by first and second side walls, first and second end walls and a bottom. Means are provided for supporting the blank within the confines of the side walls and end walls and above the bottom. A gantry structure extends transversely of the frame and movable longitudinally thereof. A laser head is connected to and is movable longitudinally of the gantry. A main control for the laser cutter causes the beam to be reflected through the gantry structure and the laser head toward the blank. The system comprises at least one sensor module mounted on the frame beneath the support means. The sensor module is operatively connected to the main control such that the laser cutter begins cutting the blank upon detection of the penetration by the sensor module.

22 Claims, 7 Drawing Sheets

SYSTEM FOR DETECTING PENETRATION OF A BLANK

TECHNICAL FIELD

This invention relates to a system for detecting penetration of a blank by a cutting device prior to cutting of the blank, and, more particularly, to a system for detecting penetration of a blank by the beam of a laser cutter prior to cutting of a workpiece therefrom, Wherein at least one sensor module is provided on the laser cutter frame beneath the support means for the blank and the sensor module is operatively connected to a control for the laser cutter which activates cutting of the blank upon detection of penetration by the sensor module.

BACKGROUND ART

For any laser cutting operation, the blank being cut must be initially pierced therethrough before the actual cutting operation can begin. This initial piercing or penetration through the blank is known in the industry as "peck through," which is a machining term stemming from a peck drilling operation wherein the drill is retracted periodically to remove metal chips. Laser cutting is similar in that it is oftentimes necessary to pulse the laser on thick materials to prevent a pool of molten material from forming. As is well known, the penetration or peck through operation performed by lasers can be a time consuming process.

It will be understood that it is necessary to penetrate through the blank before actual cutting of a workpiece therefrom can begin. In the prior art, the penetration process for laser cutting typically involves the use of a time delay having a predetermined penetration time. The penetration time of necessity must be determined experimentally for each material and thickness, which adds to the overall time needed for the process. Moreover, a safety factor is generally built into such Predetermined penetration times to account for "hard spots" in the material or to otherwise ensure penetration of the blank. As a consequence, the predetermined penetration time has traditionally been twice the time required as found through testing. Clearly, the additional time allocated for penetration of the material, as well as the initial testing required, reduces the productivity and efficiency of the laser cutting process. This is particularly true since several workpieces are cut from a blank and multiple cuts for a single workpiece are oftentimes required.

DISCLOSURE OF THE INVENTION

It is an object of the present invention to provide a system for detecting penetration of a blank during a laser cutting operation in order to immediately thereafter initiate cutting and improve the productivity and efficiency of the laser cutter.

It is another object of the present invention to provide a sensor module for detecting penetration of a blank that is especially suited for infrared detection.

It is still another object of the present invention to provide sensors of such number and arrangement as to cover the entire area beneath the blank.

In accordance with one aspect of the present invention, there is provided a system for detecting penetration of a blank by the beam of a laser cutter prior to cutting a workpiece from the blank. The laser cutter includes a frame defining an interior area bounded by first and second side walls, first and second end walls and a bottom. Means are provided for supporting the blank within the confines of the side walls and end walls and above the bottom. A gantry structure extends transversely of the frame and is movable longitudinally thereof. A laser head is connected to and is movable longitudinally of the gantry. A series of mirrors on the laser cutter causes the beam to be reflected through the gantry structure and the laser head toward the blank. The system comprises at least one sensor module mounted on the frame beneath the support means. The sensor module is operatively connected to the main control of the laser cutter such that the laser cutter begins cutting the blank upon detection of penetration by the sensor module.

BRIEF DESCRIPTION OF THE DRAWINGS

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

The penetration detection system of the present invention will be explained in conjunction with a laser cutting apparatus, although it may be utilized with any type of other suitable cutting device (e.g., a torch, arc, electron beam or plasma arc) which uses or gives off as a byproduct light energy having a measurable wavelength.

Figure 1:
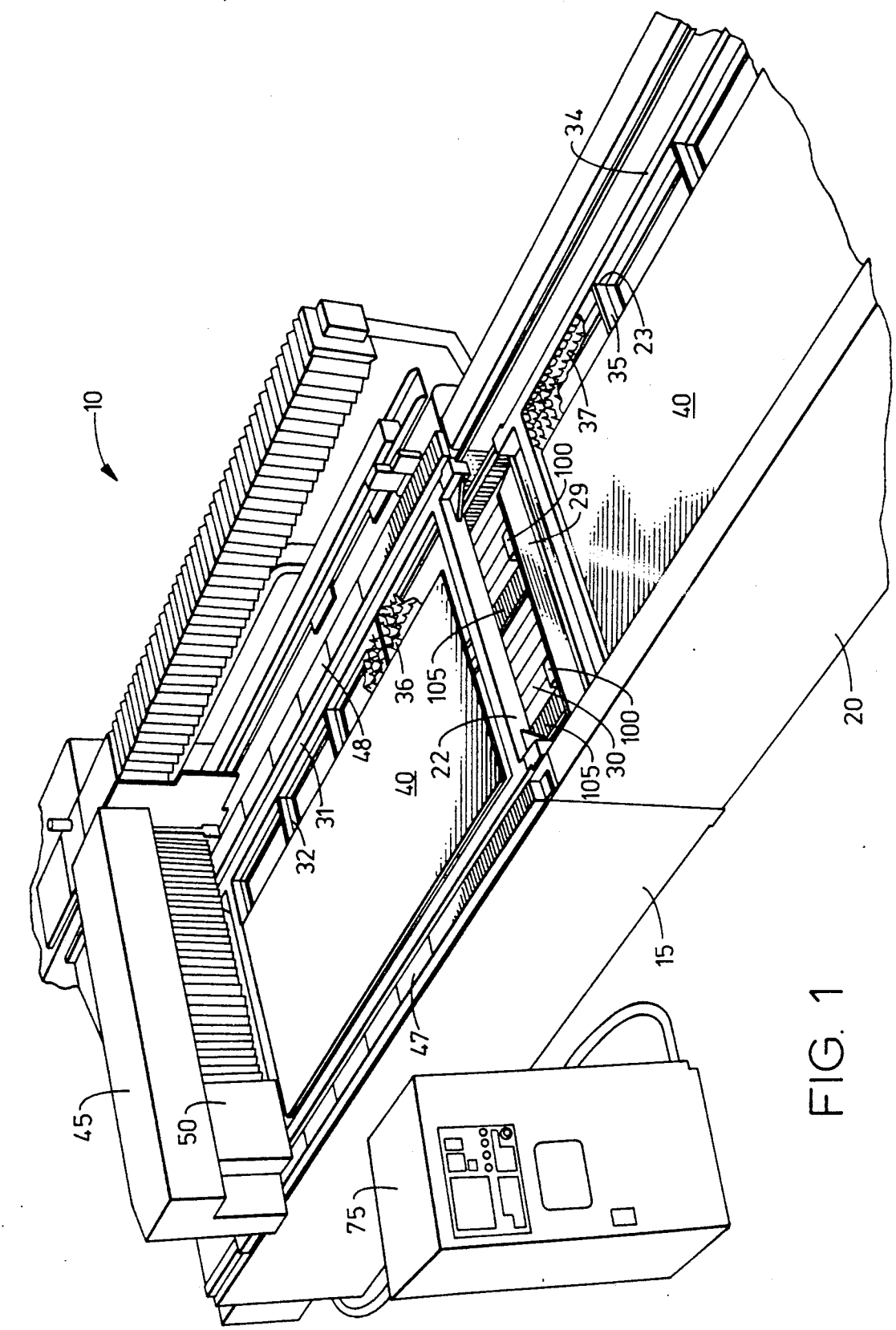
FIG. 1 is a fragmentary perspective view of an exemplary laser cutter in which the present invention is utilized.

Referring now to the drawings in detail, wherein like numerals indicate the same elements throughout the figures, FIG. 1 illustrates a laser cutting apparatus 10 in which the present invention is utilized. A commercial example of laser cutting apparatus 10 is the CNC Laser Center manufactured by Cincinnati Incorporated of Cincinnati, Ohio. It will be understood, however, that other laser cutting devices may utilize the present invention.

More specifically, laser cutting apparatus 10 comprises a main frame 15 and a loading frame 20, wherein an upper pallet 22 and a lower pallet 23 may be interchanged for greater productivity (i.e., while one pallet is stationed within main frame 15 for laser cutting operations, the other pallet is positioned within loading frame 20 for unloading and reloading). Of course, the present invention does not require a loading frame, but only an area where laser cutting operations take place.

Figure 2:
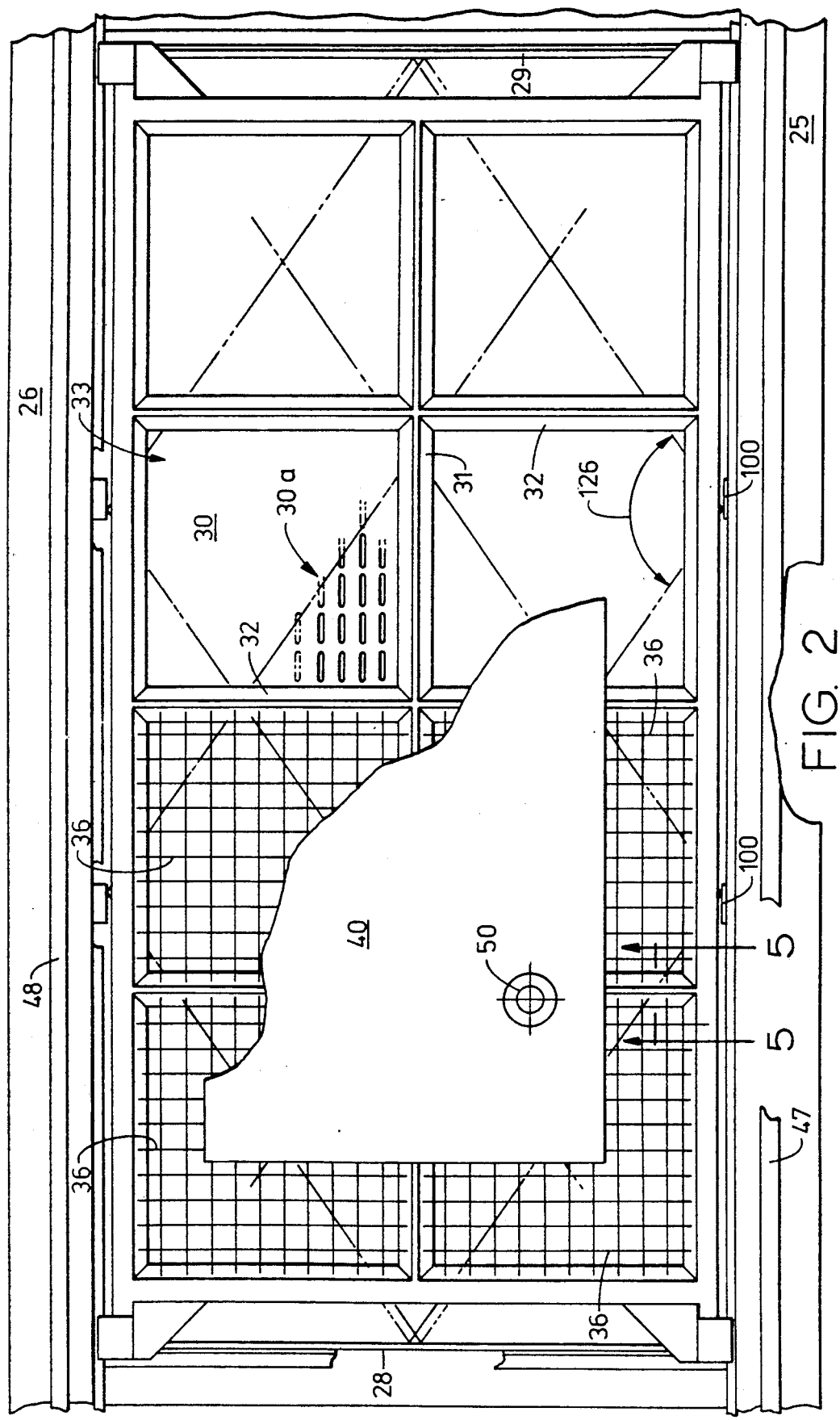
FIG. 2 is a fragmentary top view of a preferred embodiment of the system of the present invention applied to the laser cutter of FIG. 1 with portions of the laser cutter omitted for clarity.

As best seen in FIG. 2, main frame 15 includes first and second side walls 25 and 26 (which are of a fabricated channel design), and first and second end walls 28 and 29. Further, a bottom 30 is attached to side walls 25 and 26 and end walls 28 and 29 to form an interior area 33. Side walls 25 and 26 are maintained in spaced relationship by intermediate lateral braces 27 (see FIGS. 3 and 4).

Upper pallet 22 comprises a rectangular framework made up of longitudinal members 31 and transverse members 32. Lower pallet 23 is similarly a framework made up of longitudinal members 34 and transverse members 35. Upper and lower pallets 22 and 23 are supported by longitudinal members 38 and 39, respectively, which are provided along the side walls of main frame 15 and loading frame 20. Support gratings 36 and 37, preferably of an "egg crate" design, are mounted on the frame members of upper and lower pallets 22 and 23, respectively. Blanks 40 are positioned on support gratings 36 and 37 so that when upper pallet 22 or lower pallet 23 is positioned within main frame 15, the blank 40 thereon is within the confines of side walls 25 and 26 and end walls 28 and 29, as well as above bottom 30. It should be understood that by "within the confines" it is meant that blank 40 is within the area defined by side walls 25 and 26 and end walls 28 and 29, but may be above, even, or below the top edges thereof so long as it is above bottom 30. Clamping means (not shown) may also be provided to fixture blanks 40 to upper and lower pallets 22 and 23 as required.

A gantry structure 45 is provided which extends transversely of main frame 15 and is movable longitudinally thereof. In particular, gantry structure 45 moves along front and rear longitudinal guides 47 and 48, respectively, which are provided on first and second side walls 25 and 26. Movement of gantry structure 45 is provided by a ball screw arrangement or similar carriage/rail arrangement (not shown). A laser head 50 is connected to gantry structure 45 so that it is substantially normal to and is movable longitudinally thereof. A laser (not shown) provides a beam 60 (see FIGS. 3 and 4) which is reflected by a series of mirrors (not shown) through gantry structure 45 and out laser head 50 so that it may be used to cut blank 40 according to predetermined patterns.

In conjunction with laser cutting apparatus 10, a main control 75 is provided which outputs control signals to activate or deactivate the laser, and to shift gantry structure 45 and laser head 50, so that desired cuts in blank 40 can be made. Main control 75 is also utilized to store various workpiece patterns which can be cut from blank 40, as well as to provide a coordinate system for locating positions on blank 40.

Figure 3:
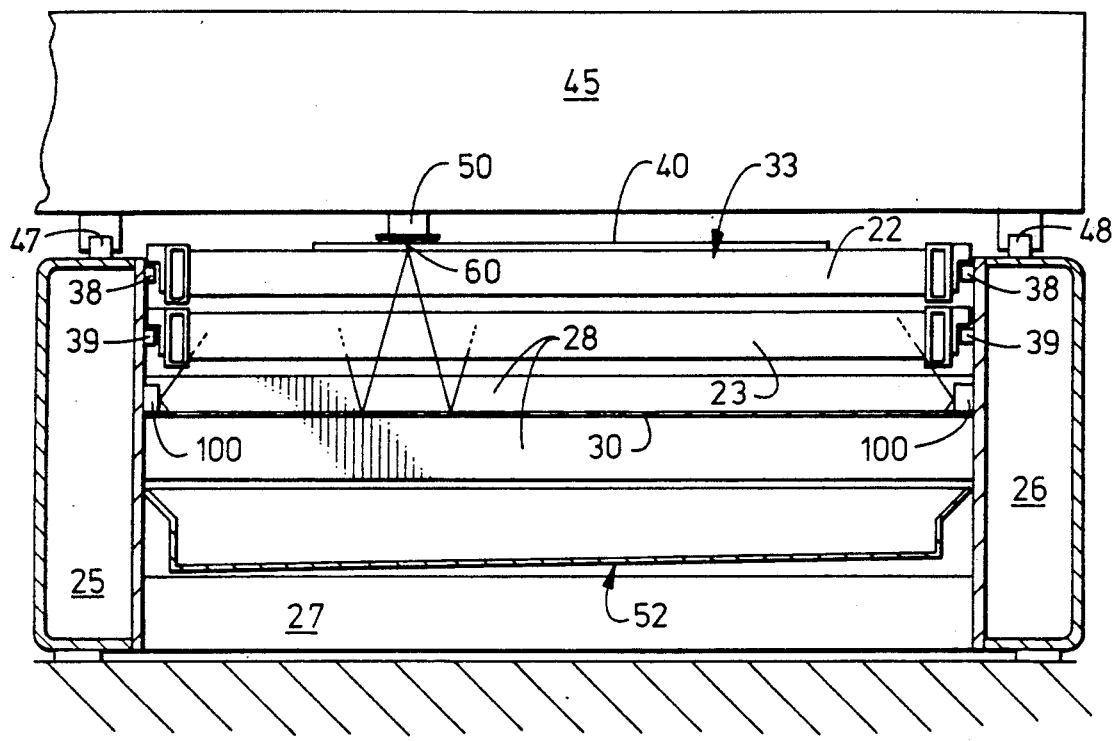
FIG. 3 is a fragmentary transverse cross-sectional view of the system of FIG. 2 where the laser cutter has a planar bottom.

As can be appreciated, a number of workpieces may be cut from a single blank 40. Further, such workpieces may include a plurality of cut out portions. As discussed herein, in order for a laser to perform a cutting operation, penetration through the blank for each cut must first occur. Rather than rely on time delays which are common in the prior art, the present invention provides a system which detects when beam 60 has penetrated blank 40. This system includes one or more sensor modules 100 which are placed within the confines of side walls 25 and 26 and end walls 28 and 29 of main frame 15 so that beam 60 may be detected upon penetration of blank 40. Preferably, sensor modules 100 will be mounted on side walls 25 and 26 and/or end walls 28 and 29, depending upon the configuration of bottom 30 of main frame 15. So long as beam 60 is detectable within interior area 33 of main frame 15, however, placement of sensor modules 100 is unimportant. As seen in FIGS. 2 and 3, sensor modules 100 are mounted on side walls 25 and 26 when bottom 30 is substantially planar. As seen in FIG. 3, a pan 52 is provided below bottom 30 to receive cutting debris and other fluid which passes through openings 30A in bottom 30.

Figure 4:
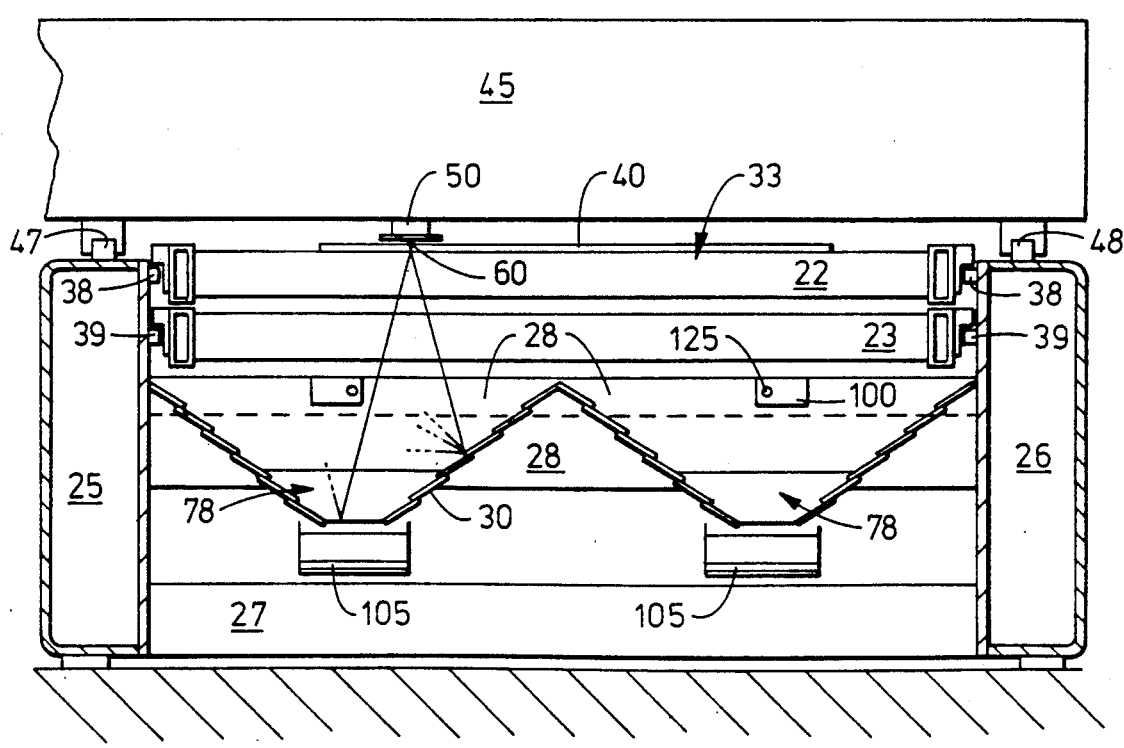
FIG. 4 is a fragmentary transverse cross-sectional view of the system in the laser cutter of FIG. 1 having a non-planar bottom.

When bottom 30 of main frame 15 is of a "W" configuration or otherwise substantially non-planar (as depicted in FIGS. 1 and 4), sensor modules 100 are mounted on end walls 28 and 29 of main frame 15 so that they can detect beam 60 within troughs 78. Bottom 30 in FIGS. 1 and 4 is preferably of a "shingled" design to deflect cut portions of blank 40 onto conveyors 105 which are provided longitudinally along the lowermost portion of troughs 78 to remove cut portions of blank 40 and other debris. This shingled design also enables a vacuum (not shown) to draw out exhaust fumes from interior area 33.

It will be appreciated that in the event penetration through blank 40 occurs substantially in alignment with longitudinal members 31 or 34 or transverse members 32 or 35, beam 60 would strike such members and sensor modules 100 would be unable to detect beam 60 or the penetration of blank 40. Accordingly, laser cutting apparatus 10 would continue the penetration process indefinitely. In order to counteract this problem, main control 75 may be programmed to include a default time, after which main control 75 activates cutting or causes gantry 45 or laser head 50 to move to a different location on blank 40.

Figure 5:
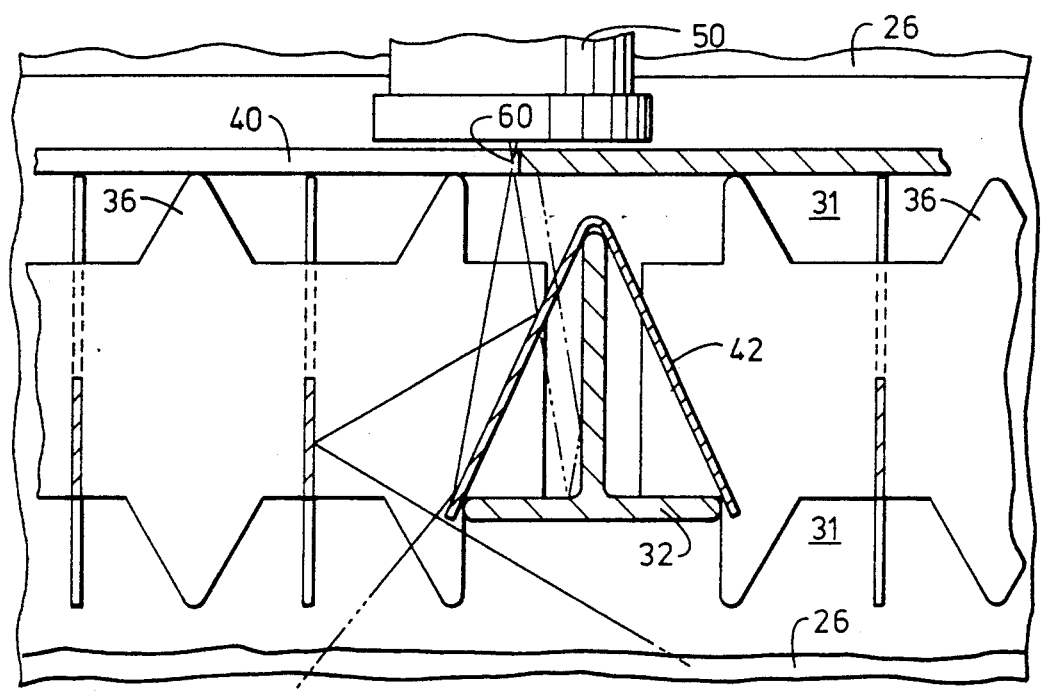
FIG. 5 is a fragmentary cross-sectional view taken along section line 5—5 of FIG. 2 and including its laser head.

Alternatively, as best seen in FIG. 5, a reflective shield 42 may be mounted on longitudinal members 31 and 34 and transverse members 32 and 35. This would cause beam 60 to be reflected into interior area 33 of laser cutting apparatus 10 so that it could be detected by sensor modules 100.

Figures 8, 9:
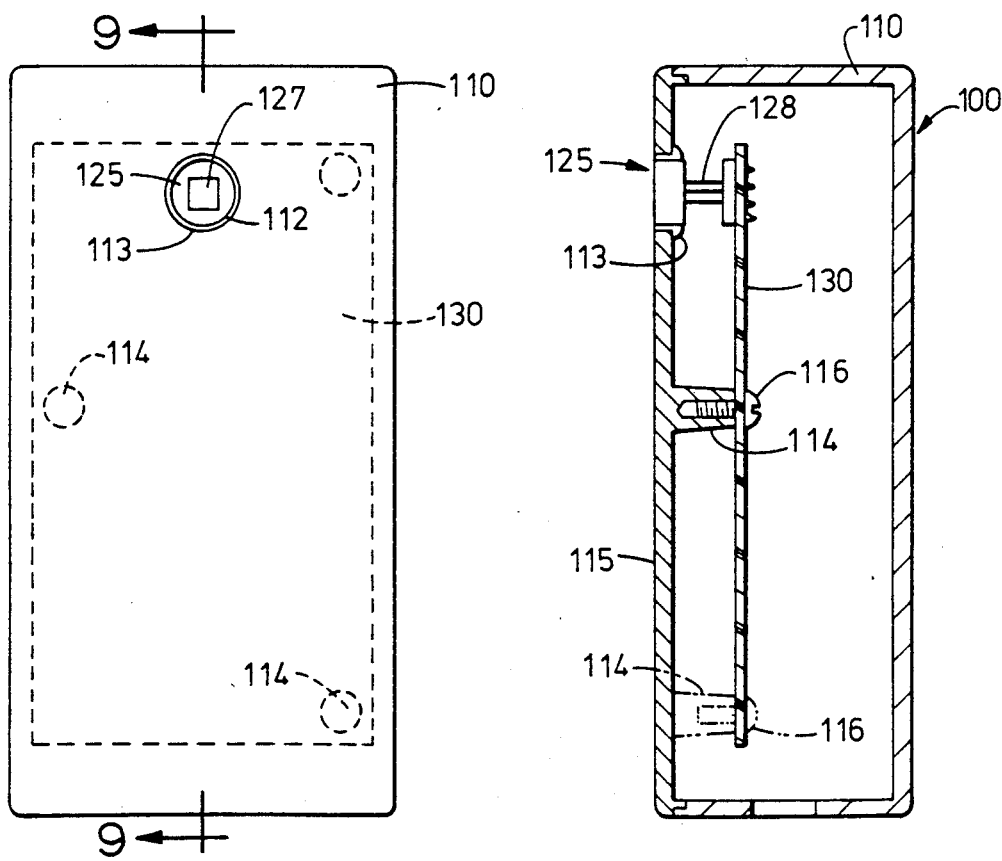
FIG. 8 is a front view of the sensor module of the present invention.
FIG. 9 is a cross-sectional view taken along section line 9—9 of FIG. 8.

More specifically, each sensor module 100 (see FIGS. 8 and 9) comprises a housing 110 containing a sensing element 125, which is preferably a pyroelectric passive infrared detector. An example of such a detector is manufactured by Nippon Ceramic Co., Ltd. and has the designation Model No. SSAC10. Sensing element 125 has the ability to sense light within a specified wavelength range on the spectrum. It further comprises a filter portion 127, as well as a leaded portion 128 that is connected to a circuit board 130. In particular, it should be understood that housing 110 has an opening 112 in which sensing element 125 is retained so that the infrared detectors therein may view interior area 33. Caulking 113 is provided about the periphery of sensing element 125 to maintain stability within opening 112. Integral bosses 114 are provided on cover 115 of housing 110, upon which circuit board 130 is maintained in position by screws 116.

With respect to sensing element 125, the wavelength range within which it can detect light is established through use of filter 127. For the purposes of detecting beam 60 or a spark shower (which occurs when heated pieces of blank 40 blow through upon penetration thereof), a silicon filter 127 is provided which allows detection of light having a wavelength within the far infrared portion of the spectrum. Preferably, sensing module 100 is provided with a filter which allows detection of light having a wavelength of from about 7.5 to about 14.0 microns. Both hot sparks and beam 60 (preferably from a $CO_2$ laser) radiate in this spectral range, thereby allowing sensing element 125 to detect them.

Moreover, it should be understood that filter portion 127 has a defined field of vision 126. (as seen in FIG. 2) which for the pyroelectric passive infrared detector of the preferred embodiment is about 111°. Sensing element 125 will be more effective in the middle portion of field of vision 126, and gradually become less sensitive at the boundaries thereof. Also, it has been found that sensing element 125 is commercially reliable within a predetermined range (approximately seven feet). This range may be enhanced through lenses and the like, but are not usually desirable because of cost and their effect on narrowing field of vision 126. Accordingly, sensor modules 100 must be positioned on main frame 15 in such number and location that allow reliable detection of penetration.

Figure 6:
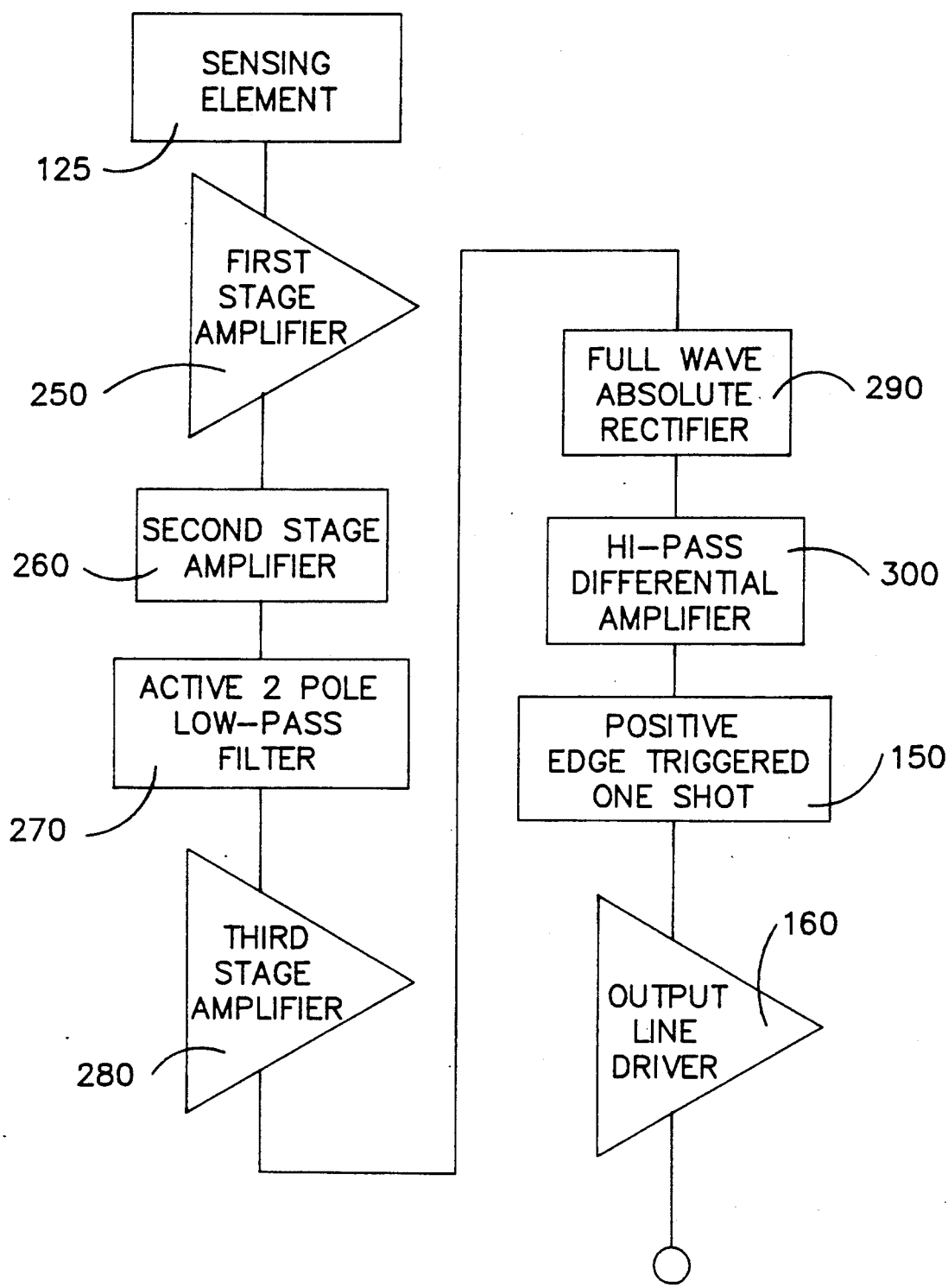
FIG. 6 is a logic diagram for the sensor module of the present invention.

As seen in the logic diagram of FIG. 6, once sensing element 125 has detected light within its spectral range, it provides a signal which undergoes a plurality of amplifying and filtering stages to improve the signal-to-noise ratio thereof. After undergoing this action, if the detection of light in interior area 33 within the predetermined wavelength range occurs quickly enough, a pulse having a predetermined width is provided from a positive edge-triggered one-shot circuit 150 to an output line driver 160. This signals main control 75 that penetration through blank 40 has occurred, whereby laser cutting apparatus 10 is then signaled to perform cutting operations on blank 40.

Figure 7:
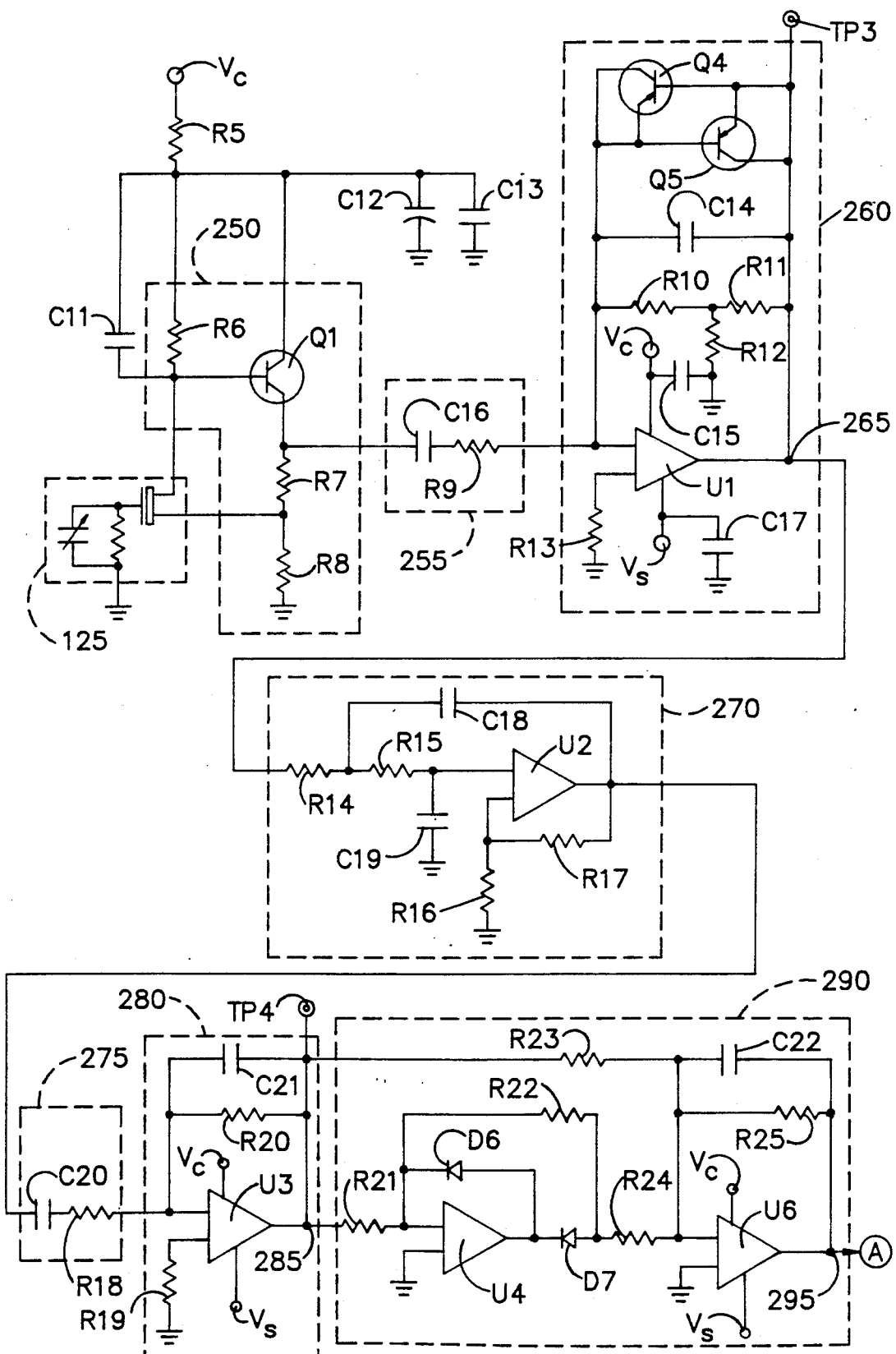
FIGS. 7 and 7A are schematic diagrams of the sensor module of the present invention.
Figure 7A:
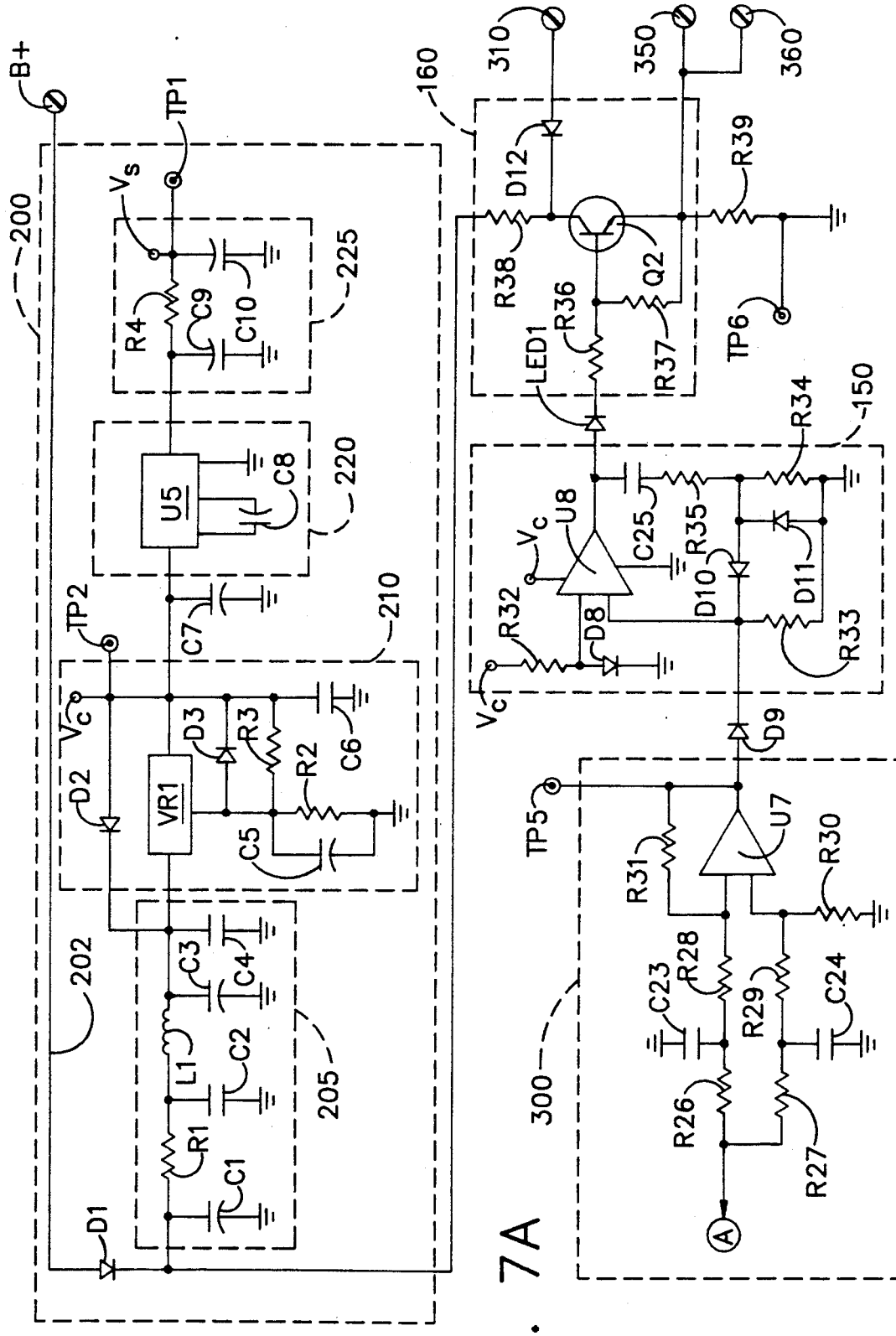

As depicted in FIG. 7A, power supply circuit 200 provides a positive and a negative voltage, Vc and Vs respectively, to various electrical components comprising the circuitry of sensory module 100. Terminal B+ and common terminal 350 are connected to main control 75, wherein a raw voltage of 21 to 32 volts is provided from a power supply therein. Power supply circuit 200 has a diode D1 connected to input line 202 for reverse polarity protection. Power supply circuit 200 next comprises a double pi filter network 205 made up of capacitors C1-C4, resistor R1, and inductor L1, which is connected to input diode D1. Double pi network 205 filters the raw voltage of power supply 200 by stripping off all radio frequency and other noise attendant thereto, thereby enabling a good direct current (DC) signal. Thereafter, a voltage regulation circuit 210 is provided where a voltage regulator VR1 is connected to the output of double pi network 205 to maintain a +8 volt regulated output at test point TP2 (Vc). An example of such a voltage regulator is manufactured by National Semiconductor and has the designation Model No. LM317LM. It should be understood that the regulated voltage at test point TP2 is established through the network made up of capacitors C5 and C6 and resistors R2 and R3. Thus, depending upon the values for these resistors and capacitors in voltage regulation circuit 210, any other desired regulated voltage may be established. Diodes D2 and D3 are included in voltage regulation circuit 210 in order to prevent reverse current from damaging voltage regulator VR1. Capacitor C7 is connected to the output of voltage regulator VR1 and acts as a filter on the regulated voltage, wherein the load response of voltage regulator VR1 is improved.

An inverter circuit 220 is connected to voltage regulation circuit 210 wherein a voltage inverter U5 is used to make the regulated voltage negative. An example of such a voltage inverter is manufactured by Maxim and has the designation Model No. ICL7660. Capacitor C8 couples the switched voltage of voltage inverter U5 to generate a negative supply. Thereafter, a pi filter 225 made up of capacitors C9 and C10 and resistor R4 is connected to the output of voltage inverter U5 in order to again filter out electrical noise and provide a clean DC signal at test point TP1. As preferably provided, the regulated voltage at test point TP1 (Vs) will be −7.3 volts. Accordingly, voltage B+ from power supply circuit 200 will be in the range of 21-32 volts, Vc from regulator VR1 will be approximately +8 volts and voltage Vs will be approximately −7.3 volts.

Sensing element 125 is schematically depicted in FIG. 7. The pyroelectric passive infrared detector utilized for sensing element 125 in the preferred embodiment is sensitive to infrared light and creates a potential difference or voltage when it detects an object in its spectral range.

A first stage amplifier circuit 250 is connected to the output of sensing element 125 in the form of PNP low noise transistor Q1 (e.g., Model No. MPS4126 by Motorola) and resistors R6-R8. In particular, the gain of amplifier circuit 250 is determined by the ratio of resistors R7 and R8 plus one. Amplifier circuit 250 is known in the art as a negative feedback closed loop amplifier and is self-biasing for added stability.

A filter comprising capacitors C12 and C13 and resistor R5 is provided to clean up any noise from input voltage Vc and prevent it from being amplified with the signal from sensing element 125. Further, capacitor C11 is connected in parallel to the output of sensing element 125 to filter any noise from sensing element 125 and prevent it from being amplified. In this way, the signal-to-noise ratio is improved.

A high pass filter 255 made up of capacitor C16 and resistor R9 is then connected in series to the collector of transistor Q1 in order to prevent the collector voltage from getting to second stage amplifier circuit 260 and particularly to amplifier U1. A high frequency filter comprising capacitor C14 and resistors R10 and R11 is provided in parallel to amplifier U1 in second stage amplifier circuit 260 to filter out high frequency noise. Transistors Q4 and Q5 are connected in parallel thereto, wherein they are connected back to back so that the collector-emitter portions are tied together. By so doing, the diode junctions of transistors Q4 and Q5 are utilized in order to provide a substantially higher amount of gain for a smaller input than for a larger input. Second stage amplifier circuit 260 in essence acts as a "log amplifier" since the gain produced thereby is equivalent to the proportional output change (or the ratio of the input impedance of capacitor C16 and resistor R9 to the feedback impedance of resistors R10-R12, capacitor C14 and transistors Q4 and Q5). Of course, it will be understood by those knowledgeable in the art that the gain of this second stage amplifier circuit 260 can be varied, wherein it will be sensitive to pick up the slightest amount of signal produced by sensing element 125 representing beam 60, but will not saturate at too strong of a signal. In this way, sensing module 100 is not overdriven and can maintain an overall fast response. Accordingly, the overall gain supplied by first stage amplifier circuit 250 and second stage amplifier circuit 260 at test point TP3 is preferably about 900.

Thereafter, the signal at point 265 passes through an active two pole low-pass filter 270. Filter 270 is utilized to filter high frequency noise from the signal and comprises resistors R14 and R15 and capacitors C18 and C19. Gain is supplied to the signal through operational amplifier U2, with the gain being established by resistors R16 and R17. Thus, besides filtering high frequency noise from output signal 265, filter 270 also adds gain to the remaining signal.

A high-pass filter 275 made up of capacitor C20 and resistor R18 is used to decouple the DC component of the remaining signal and prevent slow signal changes (stemming from surrounding thermal influences and the like) from getting to third stage amplifier circuit 280 and in particular to operational amplifier U3. The gain established through third stage amplifier circuit 280 is established by resistors R18 and R20, with capacitor C21 again attenuating any high frequency. Resistor R19 is a ground reference matching resistor which matches the overall feedback resistance.

A full wave absolute rectifier circuit 290 is connected to the output of third stage amplifier circuit 280, which has the function of turning the signal at point 285 into a positive one. Full wave absolute rectifier circuit 290 is comprised of resistors R21-R25, operational amplifiers U4 and U6 (which may be provided in the form of a single integrated circuit), diodes D6 and D7, and capacitor C22. Capacitor C22 is included in the feedback path of operational amplifier U6 as filtering to restrict any instantaneous responses of operational amplifier U6. Accordingly, the signal at point 295 comes out as a positive signal whether it was positive or negative previously thereto.

Next, the signal at point 295 enters a high-pass differential amplifier circuit 300. More specifically, circuit 300 has two paths from which differential amplifier U6 samples. The first path of differential amplifier circuit 300 is made up of resistors R26 and R28, feedback resistor R31, and capacitor C23. The alternate path is made up of resistors R27, R29 and R30 and capacitor C24. The capacitors C23 and C24 were selected for the rise time needed, as well as a 10 to 1 ratio existing therebetween. In essence, circuit 300 recognizes sudden changes at its input, but any slow change (corresponding to surrounding thermal influences and the like) will not be recognized at test point TP5. Thus, circuit 300 has a high-pass characteristic since the signal must be above a certain speed (or occur within a specified time) to create an output from amplifier U7. Amplifier U7 will also provide (as seen at test point TP5) a pulsed output in order to trigger positive edge-triggered one-shot circuit 150.

Positive edge-triggered one-shot circuit 150 has the function of providing a pulse to output line driver 160 once beam 60 has been recognized by sensing element 125. Through the aforementioned filtering and amplification circuits of sensing module 100, circuit 150 generates and isolates a pulse through amplifier U8, wherein resistor R32 and diode D8 provide the threshold of amplifier U8. Thereafter, resistors R33-R35 and capacitor C25 establish the pulse width of any pulse emanating from amplifier U7.

Once a pulse is then provided by one shot circuit 150, it lights LED1 and provides a signal to the base of transistor Q2 through bias resistors R36 and R37. Resistor R38 is connected to the collector of transistor Q2 as a pull up resistor to the raw voltage B+ of power supply circuit 200. Diode D12 is connected between the collector of transistor Q2 and output 310 of sensing module 100 as an isolator so that output line driver 160 is not pulled low if another sensing module 100 is already pulled low. This is important since sensing modules 100 work in conjunction with each other as an open circuit type arrangement, meaning that only one signal from a sensing module 100 is required to activate main control 75. Accordingly, output transistor Q2 is normally off but will be able to drive the cable line while preventing noise from causing false firing.

Common terminals 350 and 360 are connected to the emitter of transistor Q2, and TP6 is grounded to the chassis of sensor unit 100. Test point TP6 then becomes a reference point at the ground. In order to prevent ground loop from occurring due to a slight potential difference between common terminals 350 and 360, resistor R39 is provided between common terminals 350 and 360 and ground. It will also be understood that a three wire cord (wherein only one common terminal is provided) may be utilized instead of the four wire cord (comprising input B+, output 310, and common terminals 350 and 360) shown and described in the preferred embodiment.

The signal provided from output transistor Q2 is then provided to an input board (not shown) in main control 75, wherein a line (not shown) connecting sensing module 100 at output terminal 310 and common terminal 360 to main control 75 is pulsed low. This signals main control 75 that penetration of blank 40 has been detected and it can provide control signals to laser cutting apparatus 10 to begin cutting blank 40.

Having shown and described the preferred embodiments of the present invention, further adaptations of the system for detecting penetration of a blank can be accomplished by appropriate modifications by one of ordinary skill in the art without departing from the scope of the invention.

What is claimed is:

1. A system for detecting penetration of a blank by the cutting means of a cutting device prior to cutting a workpiece from said blank, said cutting means being of the type producing detectable light at the point of penetration on the side of said blank facing away from said cutting means, said system comprising at least one sensor module positioned on said cutting device on the opposite side of said blank as said cutting means, control means for controlling said cutting means and its movement, said sensor module being operatively connected to said control, said sensor module having an output signal to said control means to initiate movement of said cutting means to cut said workpiece from said blank immediately upon detection of said penetration by said sensor module.

2. The system claimed in claim 1, wherein said sensor module is capable of recognizing light only within a predetermined wavelength range.

3. The system claimed in claim 2, wherein said sensor module is capable of recognizing light having a wavelength of 7.5 to 14 microns.

4. The system claimed in claim 1, wherein said cutting means comprises a laser beam, said cutting device comprises a frame defining an interior area bounded by first and second side walls, first and second end walls and a bottom, means for supporting said blank within the confines of said side walls and said end walls and above said bottom, a gantry structure extending transversely of said frame and being movable longitudinally of said frame, a laser head connected to and movable longitudinally of said gantry structure, said laser beam being reflected through said gantry structure and said laser head toward said blank, wherein said beam may be applied within the confines of said side walls and said end walls, said at least one sensor module being mounted on said frame beneath said support means.

5. The system claimed in claim 4, wherein said at least one sensor module is mounted on at least one of said side walls when said bottom of said frame is substantially planar.

6. The system claimed in claim 4, wherein said at least one sensor module is mounted on at least one of said end walls when said bottom of said frame is substantially non-planar.

7. The system claimed in claim 2, wherein the predetermined wavelength range recognizable by said sensor module may be adjusted through use of filters.

8. The system claimed in claim 1, including sensor modules of such number and so arranged as to detect penetration at any point within the entire area of said blank.

9. The system claimed in claim 8, wherein each of said sensor modules is operatively connected to said control means such that detection of penetration by any of said sensor modules will produce said output signal to said control means to initiate cutting movement of said cutting means.

10. The system claimed in claim 1, wherein said control advances said cutting device to cut said workpiece after a predetermined time regardless of penetration detection by said sensor module.

11. The system claimed in claim 4, wherein said support means for said blank comprises a pallet made up of frame members extending longitudinally and transversely of said cutting device frame and is located within the confines thereof, said pallet frame members supporting a grid means upon which said blank rests, said pallet frame members being covered with a reflective material to reflect said beam below said pallet.

12. A system for detecting penetration of a blank by the beam of a laser cutter prior to cutting a workpiece from said blank, said laser cutter comprising a frame defining an interior area bounded by first and second side walls, first and second end walls and a bottom, means for supporting said blank within the confines of said side walls and said end walls and above said bottom, a gantry structure extending transversely of said frame and being movable longitudinally of said frame, a laser head connected to and movable longitudinally of said gantry structure, said beam being reflected through said gantry structure and said laser head toward said blank, such that said beam may be applied within the confines of said side walls and said end walls, a control means for controlling said laser beam and its movement, said system comprising at least one sensor module mounted on said frame beneath said support means, said at least one sensor module being operatively connected to said control said, at least one sensor module having an output signal to said control means to initiate movement of said laser beam to cut said workpiece upon detection of said beam by said sensor module.

13. The system claimed in claim 12, wherein said at least one sensor module is mounted on at least one of said side walls when said bottom of said frame is substantially planar.

14. The system claimed in claim 12, wherein said at least one sensor module is mounted on at least one end of said end walls when said bottom of said frame is substantially non-planar.

15. The system claimed in claim 12, wherein said support means for said blank comprises a pallet made up of frame members extending longitudinally and transversely of said cutting device frame and is located within the confines thereof, said pallet frame members supporting a grid means upon which said blank rests, said pallet frame members being covered with a reflective material to reflect said beam below said pallet.

16. The system claimed in claim 12, said sensor module being capable of recognizing the wavelength of said beam.

17. The system claimed in claim 16, wherein the predetermined wavelength range recognizable by said sensor module may be adjusted through use of filters.

18. The system claimed in claim 12, including sensor modules of such number and so arranged as to detect penetration under the entire area of said blank.

19. The system claimed in claim 18, wherein each of said sensor modules is operatively connected to said control means such that detection of penetration by any of said sensor modules will produce said output signal to said control means to initiate cutting movement of said beam.

20. The system claimed in claim 12, wherein said control advances said laser beam to cut said workpiece after a predetermined time regardless of penetration detection by said sensor module.

21. The system claimed in claim 12, wherein said support means for said blank comprises a pallet made up of frame members extending longitudinally and transversely of said cutting device frame and is located within the confines thereof, said pallet frame members supporting a grid means upon which said blank rests, said pallet frame members being covered with a reflective material to reflect said beam below said support means.

22. A sensor module for detecting penetration of a blank by a cutting means prior to cutting a workpiece therefrom, said cutting means being of the type producing light at the position of said penetration, said sensor module being operatively connected to a control for said cutting means and its movement to advance said cutting means to initiate cutting of said blank upon detection of said penetration, comprising:
  (a) a housing;
  (b) a detector attached to and contained within said housing, said detector being so positioned that it aligns with an opening in said housing such that it is capable of recognizing light produced by said cutting means within a predetermined wavelength range and generating a signal upon such recognition;
  (c) means for improving the signal-to-noise ratio for said signal;
  (d) means for distinguishing said signal from noise detected by said detector; and
  (e) means for generating an output signal to said control upon detection of said penetration.

* * * * *